United States Patent [19]
Johnson et al.
[11] Patent Number: 4,518,362
[45] Date of Patent: May 21, 1985

[54] OPERATION CONTROL FOR ELECTRIC OUTBOARD MOTOR

[75] Inventors: Wallace R. Johnson, Mundelein; W. Wayne Beem, Zion, both of Ill.

[73] Assignee: Outboard Marine Corporation, Waukegan, Ill.

[21] Appl. No.: 516,571

[22] Filed: Jul. 25, 1983

[51] Int. Cl.[3] .............................................. B60L 11/02
[52] U.S. Cl. ....................................... 440/6; 180/19.3; 200/156; 440/86
[58] Field of Search .............................. 440/6, 84–87, 440/53, 63, 64; 74/879, 504, 471 R; 192/0.098, 0.096; 200/61.88, 331, 332, 330, 155 R, 156, 157, 336; 318/588; 338/117; 180/19.3, 65.1, 332

[56] References Cited

U.S. PATENT DOCUMENTS

| | | | |
|---|---|---|---|
| 638,542 | 12/1899 | Atwood | 440/6 |
| 2,668,200 | 2/1954 | Glaze | 74/471 |
| 3,073,347 | 1/1963 | Bent | 74/471 |
| 3,315,631 | 4/1967 | Bass | 440/6 |
| 3,524,423 | 8/1970 | Bitney | 114/162 |
| 3,580,212 | 5/1971 | Fortson | 440/6 |
| 3,602,868 | 8/1971 | Lybrook | 338/198 |
| 3,697,921 | 10/1972 | Urwin | 338/131 |
| 3,820,641 | 6/1974 | Borst | 192/0.098 |
| 3,878,809 | 4/1975 | Ray | 440/6 |
| 3,906,887 | 9/1975 | Kappas | 440/6 |
| 3,939,725 | 2/1976 | Fisher | 200/331 |
| 4,268,258 | 5/1981 | Beem | 440/63 |
| 4,367,689 | 1/1983 | Lukehart et al. | 114/346 |
| 4,401,866 | 8/1983 | Kaminski | 200/61.88 |

*Primary Examiner*—Jesûs D. Sotelo
*Attorney, Agent, or Firm*—Michael, Best & Friedrich

[57] ABSTRACT

The electric outboard motor has a control head in which a steering tiller is mounted for limited rotational and axial movement. A rotary switch is operated by rotary movement of the tiller and regulates operation and speed of the motor. A toggle switch is operated by axial movement of the tiller to select forward and reverse operation of the motor. Motor operation, speed, forward and reverse are controlled by the steering tiller.

14 Claims, 5 Drawing Figures

OPERATION CONTROL FOR ELECTRIC OUTBOARD MOTOR

FIELD OF THE INVENTION

This invention relates to the operating controls for an electric outboard motor.

BACKGROUND OF THE INVENTION

Electric outboard motors have been provided with a number of switches to control operation, speed, and forward and reverse. Some motors have used a twist tiller to regulate speed. It is desireable to simplify motor operation.

Attention is directed to U.S. Pat. Nos. 4,268,258; 3,697,921; 3,602,868; 3,524,423; 4,367,689.

SUMMARY OF THE INVENTION

The object of this invention is to provide a control head in which a steering tiller is mounted for limited rotational and axial movement and operates a first switch by rotation of the tiller to regulate operation and speed of the motor and operates a second switch by axial motion of the tiller to select forward or reverse operation of the motor.

A further object is to mount the reversing switch alongside the tiller and actuate the toggle lever of the switch by means of a coupling which engages the lever and straddles a reduced diameter in the tiller so the tiller can rotate relative to the coupling while moving the coupling axially. The invention also provides a rotary switch having its operating shaft fixed to the rear end of the tiller and having its housing slideably in the control head and restrained against rotation. The rotary switch moves axially with the tiller.

This invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DETAILED DESCRIPTION OF THE DRAWINGS

Figure 4:
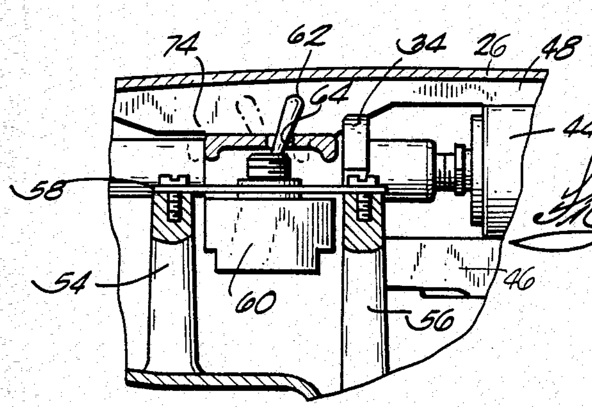
FIG. 4 is a fragmentary elevation taken on line 4—4 in FIG. 2.
Figure 5:
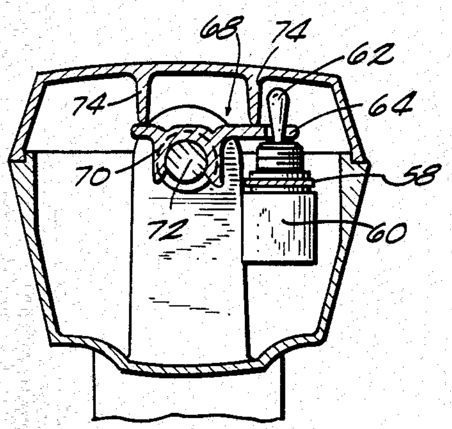
FIG. 5 is a section taken as indicated by line 5—5 in FIG. 2.
Figure 1:
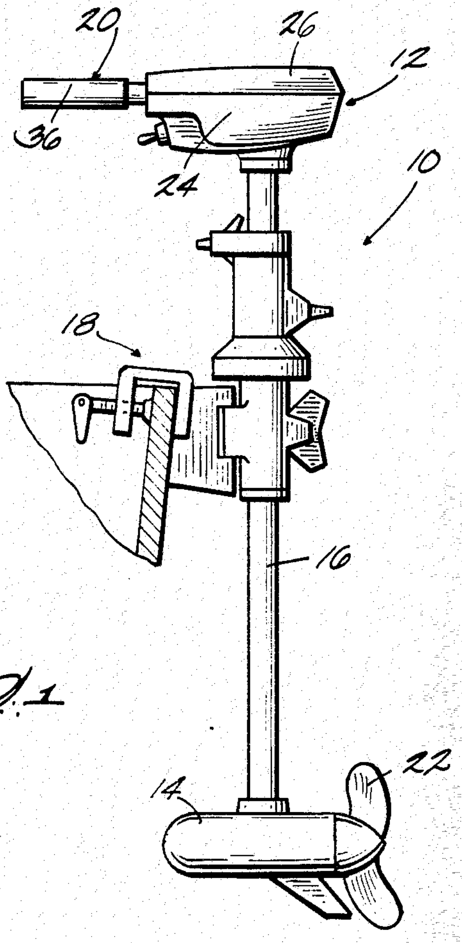
FIG. 1 is a side elevation of an outboard motor.
Figure 2:
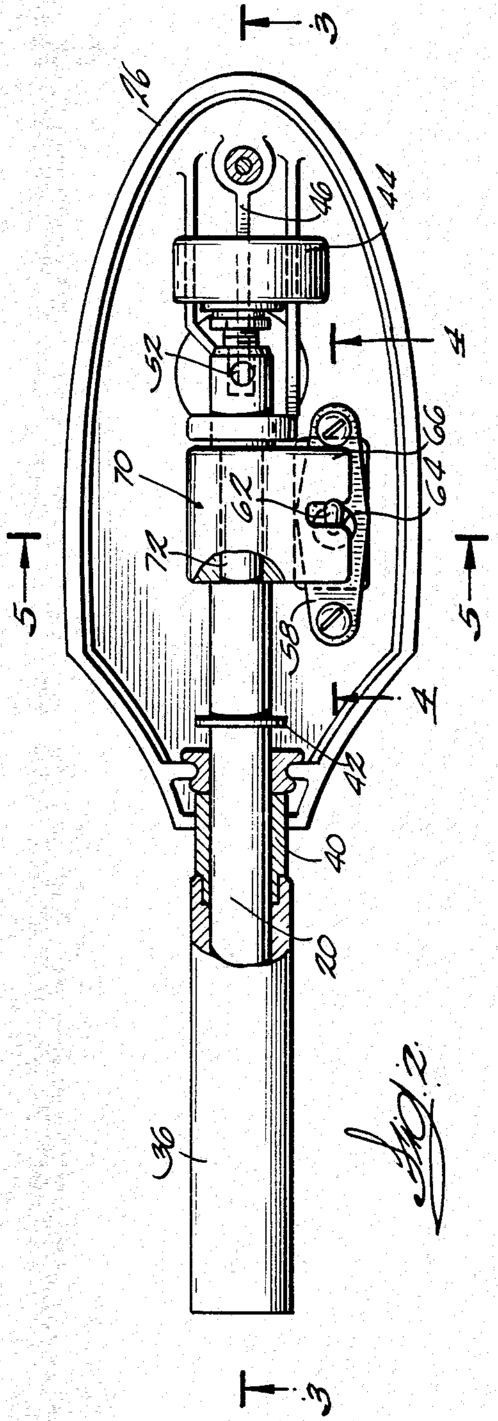
FIG. 2 is a plan view of the control head with the cover removed and part of the handle in section.
Figure 3:
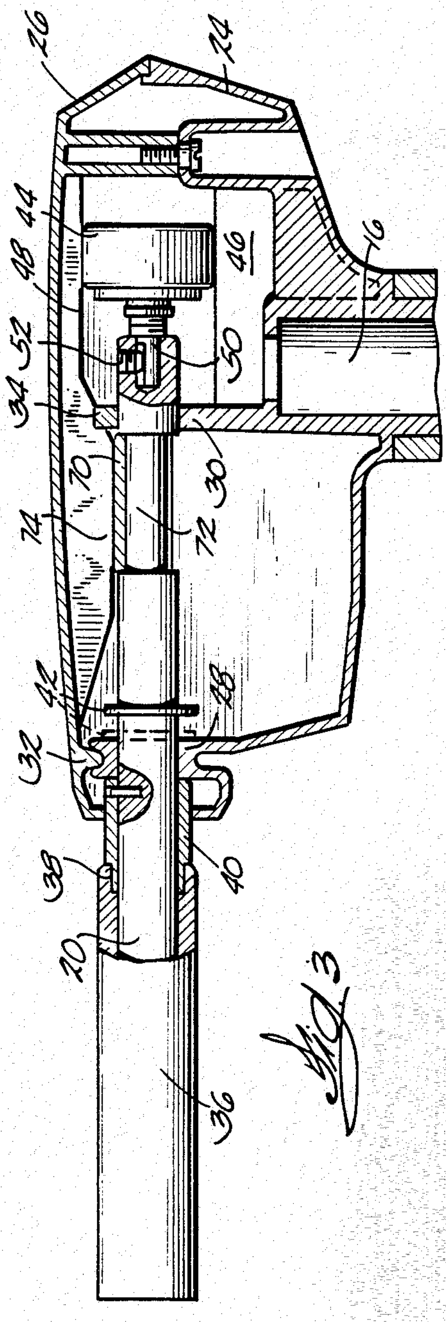
FIG. 3 is a vertical cross section on line 3—3 in FIG. 2.

The electric outboard motor 10 has a control head 12 to which the lower housing 14 is connected by the tube 16 pivotally supported in the transom clamp 18. Steering is controlled by means of the tiller handle 20 projecting forwardly from the control head 12. The control head contains the various electrical switches for regulating operation of the electric motor in the lower unit 14 for forward and reverse operation as well as speed. The motor rotates propeller 22 in the desired direction.

The control head 12 is horizontally split to provide a lower housing 24 and a cover 26. The casting for the lower housing has integral bearing supports 28, 30 which craddle the tiller 20 and cooperate with the integral bearings 32, 34 cast in the cover to journal the tiller 20 for rotational and limited axial movement. As shown in the drawings, the cover 36 telescopes over the tiller and the step 38 on the front of sleeve 40 fixed to the tiller and shown abutting the front of the bearings 28, 32 to limit rearward movement of the tiller. A snap ring 42 is mounted on the tiller rearwardly of the bearings 28, and limits forward movement of the tiller. The tiller has about ¼" travel between the illustrated view and the position it would occupy when the snap ring engages the back side of the bearing 28.

Behind the rear end of the tiller, there is a rotary step switch 44 resting on rib 46 molded in the lower housing 24. A pair of spaced ribs 48 on the under surface of the cover engage the upper surface of the switch housing. The four ribs constrain the switch housing against rotation about the tiller axis but the switch housing can slide fore and aft on the ribs. The "D" shaped actuating shaft of the switch projects into a hole in the rear end of the tiller and set screw 52 is tightened against the flat of the D shaft 50. Rotary movement of the tiller turns the switch actuating shaft 50 to control on-off operation and the speed of the motor. When the tiller is moved fore and aft, the switch moves along with it. This arrangement is more cost effective than fixing the switch in the control head and having a telescoping connected between the axially moveable tiller and the switch shaft. The later would be a feasible construction but is more expensive.

Plate 58 is connected by screws to bosses 54, 56 molded in the lower housing. This plate supports a toggle acting switch 60 to one side of the tiller with the toggle lever 62 projecting upwardly and received in the slot 64 in the arm portion 66 of the coupler 68 which has a saddle portion 70 straddling the recessed diameter portion 72 of the tiller. The saddle is captured between the ends of the reduced diameter portion 72 and must travel fore and aft with the tiller. The cover 26 of the control head is provided with depending ribs 74, 74 which engage the coupler to prevent it from rotating when the tiller rotates. The arm portion straddling the toggle switch lever will operate the toggle switch when the tiller is moved forward or rearward, providing the difference between the smaller diameter 72 and the larger diameter 20 is maintained to capture the coupler 68.

The toggle switch is wired so rearward movement of the tiller connects the motor for reverse operation and the boat will back up. When the tiller is pulled forwardly, the boat goes forward. Rotational movement of the tiller controls the speed and, at one limit of its turning movement, will turn the motor on and off. The electric motor speed need not be decreased in order to shift from forward to reverse. Thus, even with the motor at full speed the tiller can be moved forward or rearward to shift the operating mode.

With this arrangement the operation of the electric outboard is simplicity in itself. One hand does everything from start to stop, speeds up, slows down, and shifts forward and reverse. This makes for the simplest sort of operation.

We claim:

1. An electric outboard motor having a control head in which a steering tiller is mounted for limited rotational and axial movement relative to and within said control head, a first switch located in said control head and operated by rotation of the tiller to regulate operation and speed of the motor, and a second switch located in said control head and operated by axial motion of the tiller to select forward or reverse operation of the motor.

2. An outboard motor according to claim 1 in which the first switch is mounted in the control head behind the rear end of the tiller.

3. An outboard motor according to claim 2 in which said first switch is non-rotatably slideable in the head in common with axial movement of the tiller.

4. An outboard motor according to claim 1 in which the second switch is fixed in the housing next to the tiller and is operated by a toggle lever, and further including a coupling moving axially with the tiller, and means restraining the coupling against rotation, said coupling engaging said toggle lever.

5. An electric outboard motor of the type having a steerable control head connected to a propeller, a steering tiller mounted in said control head for rotary and axial movement relative to and within said control head and projecting forwardly from said control head for manually steering the motor, a rotary switch mounted in said control head and actuated by rotation of said tiller so as to control speed and energization of said motor, and a motor reversing switch mounted in said control head and operated by axial movement of said tiller.

6. The outboard motor of claim 5 including a coupling between the tiller and the reversing switch, said coupling being restrained against rotation in common with the tiller and being engaged by the tiller for movement in common with tiller axial movement.

7. The outboard motor of claim 5 in which said rotary switch has movement in common with tiller axial movement and is restrained from rotating.

8. The outboard motor of claim 5 in which the rotary switch has an actuating shaft projecting from a housing, said housing being slideably and non-rotatably mounted in said control head and said shaft being connected to said tiller to be rotated by the tiller and to cause the rotary switch to have movement in common with axial tiller movement.

9. The outboard motor of claim 8 including a coupling connected to said tiller and said reversing switch, said coupling engaging the tiller to move axially therewith while allowing the tiller to rotate relative to the coupling, and means restraining the coupling against rotation.

10. In an electric outboard motor having a control head and a lower unit in which an electric motor is housed to drive a propeller, the head and lower unit being connected by a shaft which is rotatably supported by a mounting bracket, the improvement comprising, a steering tiller mounted by and extending partially within the control head for rotational and axial motion relative to and within the control head, said tiller projecting forwardly from the control head, rotary switch means mounted in the control head and actuated by rotation of said tiller, said switch means including an on-off switch and being wired in circuit with the electric motor to control operation and speed of the motor, a reversing switch mounted in the control head and wired in the motor circuit to control the direction of rotation of the motor and propeller, and means transmitting axial movement of the tiller to the reversing switch so as to operate the reversing switch.

11. The outboard motor of claim 10 in which movement of the tiller forwardly operates said reversing switch to rotate the motor and propeller to exert forward thrust and rearward movement of the tiller operates the reversing switch to reverse rotation of the motor.

12. The outboard motor of claim 11 in which the rotary switch means is slideably and non-rotatably mounted in said control head and has an actuating shaft connected to said tiller.

13. An electric outboard motor having a propeller given by an electric motor, a steering tiller mounted in and projecting from the upper portion of the outboard motor for control by the operator, said tiller being rotatable and reciprocable within said outboard motor upper portion between forward and rearward positions, rotary switch means located in said outboard motor upper portion and wired in the electric motor circuit and including an on-off switch, means connecting the tiller to the switch means so rotation of the tiller controls operation and speed of the electric motor, and a reversing switch located in said outboard motor upper portion and actuated by reciprocative motion of the tiller and wired in the motor circuit to control the direction of motor and propeller rotation.

14. An electric outboard motor having a steerable control head and a lower unit having a propeller driven by an electric motor, the improvement comprising, a tiller handle mounted by and extending into said control head for rotary and axial movement relative to and within said head, a rotary switch mounted in said head and connected to and operated by the tiller to control operation and speed of said motor, a reversing switch mounted in said head, and means interconnecting the tiller and the reversing switch to actuate the reversing switch in response to axial movement of the tiller.

* * * * *